(12) United States Patent
Takata et al.

(10) Patent No.: US 10,903,506 B2
(45) Date of Patent: Jan. 26, 2021

(54) SEPARATOR FOR FUEL CELL

(71) Applicant: TOYOTA JIDOSHA KABUSHIKI KAISHA, Toyota (JP)

(72) Inventors: Satoshi Takata, Toyota (JP); Tomonari Kogure, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 10 days.

(21) Appl. No.: 15/981,487

(22) Filed: May 16, 2018

(65) Prior Publication Data

US 2018/0337415 A1      Nov. 22, 2018

(30) Foreign Application Priority Data

May 19, 2017   (JP) ................. 2017-100142

(51) Int. Cl.
*H01M 8/0217* (2016.01)
*H01M 8/0228* (2016.01)
*H01M 8/0206* (2016.01)
*H01M 8/0215* (2016.01)
*H01M 8/1018* (2016.01)

(52) U.S. Cl.
CPC ....... *H01M 8/0228* (2013.01); *H01M 8/0206* (2013.01); *H01M 8/0215* (2013.01); *H01M 8/0217* (2013.01); *H01M 2008/1095* (2013.01)

(58) Field of Classification Search
CPC ............. H01M 8/0228; H01M 8/0217; H01M 8/0206; H01M 8/0215; H01M 2008/1095
See application file for complete search history.

(56) References Cited

U.S. PATENT DOCUMENTS

2003/0113577 A1   6/2003  Zheng
2003/0218222 A1*  11/2003 Wager, III ............. H01L 29/02
                                                            257/410
(Continued)

FOREIGN PATENT DOCUMENTS

CN    1656618 A    8/2005
CN   102593479 A   7/2012
(Continued)

OTHER PUBLICATIONS

Li et al. "Facile synthesis of antimony-doped tin oxide nanoparticles by a polymer-pyrolysis method." Mater. Res. Bull. 45 (2010) 677-681 (Year: 2010).*

(Continued)

*Primary Examiner* — Lisa S Park
(74) *Attorney, Agent, or Firm* — Finnegan, Henderson, Farabow, Garrett & Dunner, LLP

(57) ABSTRACT

Provided is a separator for a fuel cell that can suppress a decrease in the power generation performance of the fuel cell by reducing the contact resistance of the separator. Specifically, provided is a separator for a fuel cell, the separator being adapted to be in contact with a MEGA (power generation portion) including a membrane electrode assembly of the fuel cell so as to separate the MEGA from a MEGA of an adjacent fuel cell, the separator including a metal substrate made of metal; and a tin oxide film covering a surface of the metal substrate on the side of the MEGA. The tin oxide film is made of tin oxide containing 0.2 to 10 atom % of antimony.

6 Claims, 3 Drawing Sheets

(56) References Cited

U.S. PATENT DOCUMENTS

| | | | |
|---|---|---|---|
| 2007/0298309 A1* | 12/2007 | Vyas | H01M 8/0204 |
| | | | 429/457 |
| 2009/0214927 A1* | 8/2009 | Dadheech | H01M 8/0228 |
| | | | 429/434 |
| 2013/0017471 A1 | 1/2013 | Haas et al. | |

FOREIGN PATENT DOCUMENTS

| | | |
|---|---|---|
| DE | 601 18 164 T2 | 12/2006 |
| DE | 10 2007 029 431 A1 | 1/2008 |
| DE | 11 2010 004 954 T5 | 3/2013 |
| JP | 8-185870 | 7/1996 |
| JP | 2003-528980 A | 9/2003 |
| JP | 5928364 | 6/2016 |
| WO | WO 03/092139 A2 | 11/2003 |

OTHER PUBLICATIONS

Dang et al. "The Optimum Fabrication Condition of p-Type Antimony Tin Oxide Thin Films Prepared by DC Magnetron Sputtering." J. Nanomaterials, 2016, 1-9 (Year: 2016).*

* cited by examiner

SEPARATOR FOR FUEL CELL

CROSS REFERENCE TO RELATED APPLICATIONS

The present application claims priority from Japanese patent application JP 2017-100142 filed on May 19, 2017, the content of which is hereby incorporated by reference into this application.

BACKGROUND

Technical Field

The present disclosure relates to a separator for a fuel cell, the separator being adapted to be in contact with a power generation portion including a membrane electrode assembly of the fuel cell so as to separate the power generation portion from a power generation portion of an adjacent fuel cell.

Background Art

A polymer electrolyte fuel cell has a membrane electrode assembly (MEA) that includes an electrolyte membrane with ion permeability and anode-side and cathode-side catalyst layers (electrode layers) sandwiching the electrolyte membrane therebetween. The MEA also has gas diffusion layers (GDLs) on opposite sides thereof for providing fuel gas or oxidant gas to the MEA and for collecting electricity generated through electrochemical reactions. Such a membrane electrode assembly having GDLs on opposite sides thereof is referred to as a MEGA (Membrane Electrode & Gas Diffusion Layer Assembly), and the MEGA is sandwiched between a pair of separators. Herein, the MEGA is the power generation portion of the fuel cell. If no gas diffusion layers are provided, the MEA is the power generation portion of the fuel cell.

As such a separator for a fuel cell, for example, JP H08-185870 A proposes the following separator. Specifically, the separator includes a substrate made of a cermet composed of a refractory metal containing chromium and a ceramic; and a protective film of metal oxide that covers a surface of the substrate on the side of cathode gas so as to prevent the surface from being in contact with the cathode gas. Further, JP H08-185870 A exemplarily illustrates tin oxide doped with antimony as an example of such metal oxide.

SUMMARY

According to the separator for a fuel cell of JP H08-185870 A, the diffusion of chromium to the cathode electrode is suppressed so that a decrease in the power generation performance of the fuel cell can be suppressed. However, even when such a protective film is provided, it would be difficult to suppress a decrease in the power generation performance of the fuel cell unless electrical contact resistance can be suppressed on a surface of the separator for the fuel cell that is in contact with a power generation portion including a membrane electrode assembly.

The present disclosure has been made in view of the foregoing, and exemplary embodiments relate to providing a separator for a fuel cell that can suppress a decrease in the power generation performance of the fuel cell by reducing the contact resistance between at least the separator and a power generation portion.

Accordingly, the separator for a fuel cell in accordance with the present disclosure is a separator for a fuel cell, the separator being adapted to be in contact with a power generation portion including a membrane electrode assembly of the fuel cell so as to separate the power generation portion from a power generation portion of an adjacent fuel cell, the separator including a metal substrate made of metal; and a tin oxide film covering at least a surface of the metal substrate on the side of the power generation portion. The tin oxide film is made of tin oxide containing 0.2 to 10 atom % of antimony.

According to the present disclosure, tin oxide of the tin oxide film is made to contain the aforementioned amount of antimony, whereby the conductivity of the tin oxide film can be increased and thus the contact resistance between at least the separator for the fuel cell and the power generation portion can be reduced.

DETAILED DESCRIPTION

Figure 1:
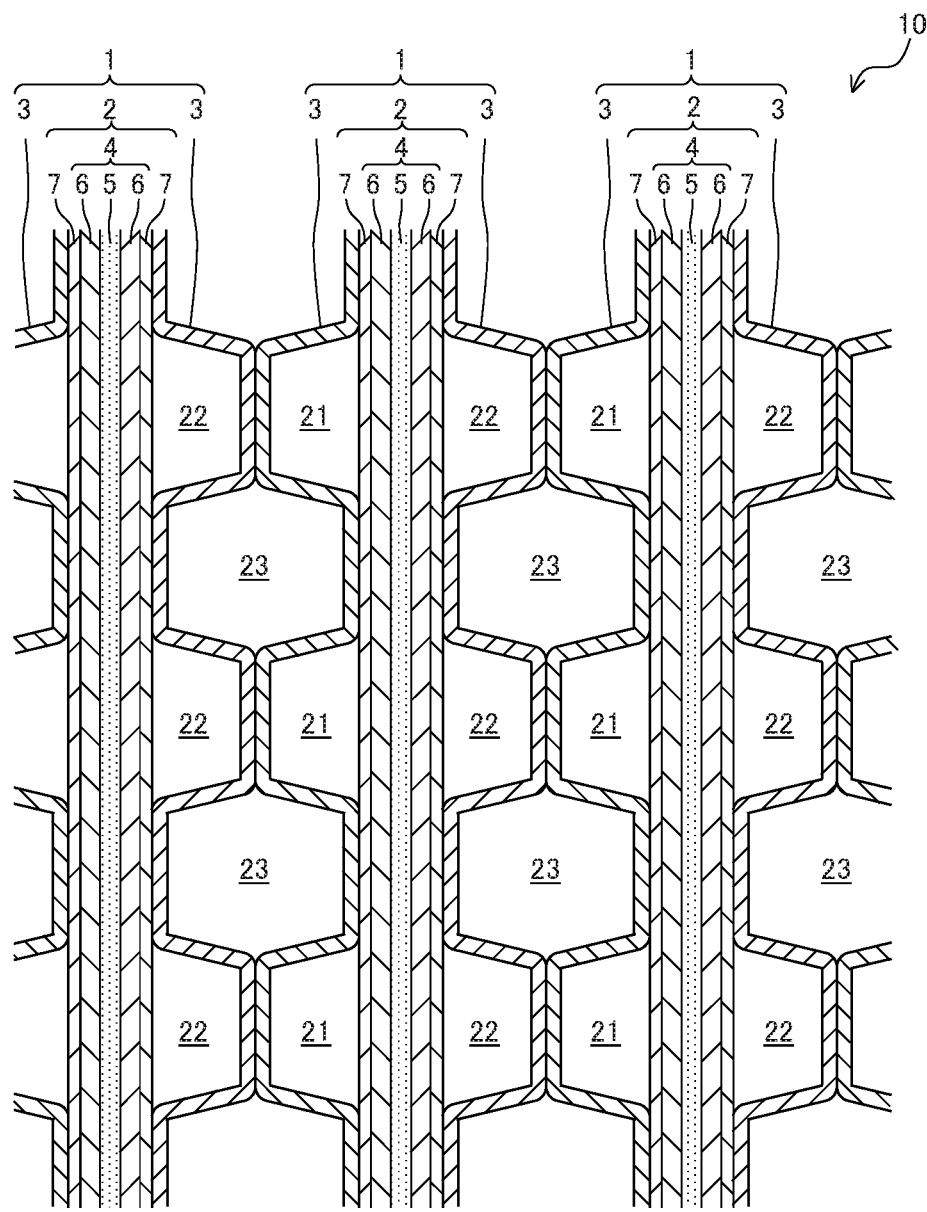
FIG. 1 is a cross-sectional view of the primary portion of a fuel cell stack including separators for fuel cells in accordance with an embodiment of the present disclosure.

Hereinafter, the configuration of the present disclosure will be described in detail based on embodiments shown in the drawings. Although the following embodiments exemplarily illustrate a case where the present disclosure is applied to fuel cells mounted on a fuel cell vehicle or a fuel cell system including such fuel cells, the applicable range of the present disclosure is not limited thereto.

FIG. 1 is a cross-sectional view of the primary portion of a fuel cell stack (fuel cells) 10. As shown in FIG. 1, the fuel cell stack 10 has a plurality of stacked unit cells 1. Each cell 1 is a polymer electrolyte fuel cell that generates an electromotive force when an electrochemical reaction occurs between oxidant gas (for example, air) and fuel gas (for example, hydrogen). The cell 1 includes a MEGA 2 and separators (separators for the fuel cell) 3 adapted to be in contact with the MEGA 2 so as to separate the MEGA 2 from MEGAs 2 of adjacent fuel cells. It should be noted that in this embodiment, the MEGA 2 is sandwiched between a pair of separators 3,3.

The MEGA 2 is an integral boy of a membrane electrode assembly (MEA) 4 and gas diffusion layers 7,7 arranged on opposite sides thereof. The membrane electrode assembly 4 includes an electrolyte membrane 5 and a pair of electrodes 6 and 6 that are joined so as to sandwich the electrolyte membrane 5 therebetween. The electrolyte membrane 5 is a proton-conducting ion exchange membrane formed of a solid polymer material, and each electrode 6 is formed of a porous carbon material having a catalyst, such as platinum, carried thereon, for example. The electrode 6 arranged on one side of the electrolyte membrane 5 serves as an anode, and the electrode 6 on the other side serves as a cathode. Each gas diffusion layer 7 is formed of a gas-permeable conductive member, such as a carbon porous body like carbon paper or carbon cloth, or a metal porous body like a metallic mesh or foam metal, for example.

In this embodiment, the MEGA 2 is the power generation portion of the fuel cell 10, and the separators 3 are in contact with the gas diffusion layers 7 of the MEGA 2. When the gas diffusion layers 7 are omitted, the membrane electrode assembly 4 is the power generation portion, and in such a case, the separators 3 are in contact with the membrane electrode assembly 4. Therefore, the power generation portion of the fuel cell 10 includes the membrane electrode assembly 4 and is in contact with the separators 3.

Each separator 3 is a plate-like member containing a metal with excellent conductivity and gas impermeability as a substrate, and one side of the separator 3 abuts the gas diffusion layer 7 of the MEGA 2, and the other side thereof abuts a side of an adjacent separator 3.

In this embodiment, each separator 3 is formed in a wave shape. Specifically, the separator 3 has such a shape that the shapes of waves form trapezoids with equal legs, the top portion of each wave is flat, and opposite ends of the top portion are angular with equal angles. The shape of each separator 3 seen from the front side and the rear side is almost the same. The top portions of the separator 3 are in surface contact with one of the gas diffusion layers 7 of the MEGA 2, and the top portions of another separator 3 are in surface contact with the other gas diffusion layer 7 of the MEGA 2.

A gas flow channel 21 defined between the gas diffusion layer 7 on one electrode (that is, anode) 6 side and the separator 3 is a channel through which fuel gas circulates, and a gas flow channel 22 defined between the gas diffusion layer 7 on the other electrode (that is, cathode) 6 side and the separator 3 is a channel through which oxidant gas circulates. When fuel gas is supplied to one of the gas flow channels 21 and oxidant gas is supplied to the gas flow channel 22 that is opposite the gas flow channel 21 with the cell 1 sandwiched therebetween, an electrochemical reaction occurs within the cell 1 so that an electromotive force is generated.

Further, a given cell 1 and another cell 1 adjacent thereto are arranged such that an electrode 6 to serve as an anode and an electrode 6 to serve as a cathode are arranged opposite each other. In addition, the top portions on the rear surface side of a separator 3, which is arranged along an electrode 6 to serve as an anode of a given cell 1, and the top portions on the rear surface side of a separator 3, which is arranged along an electrode 6 to serve as a cathode of another cell 1, are in surface contact with each other. Water as refrigerant for cooling the cells 1 circulates through spaces 23 defined between the separators 3,3 that are in surface contact with each other between the two adjacent cells 1.

Figure 2:
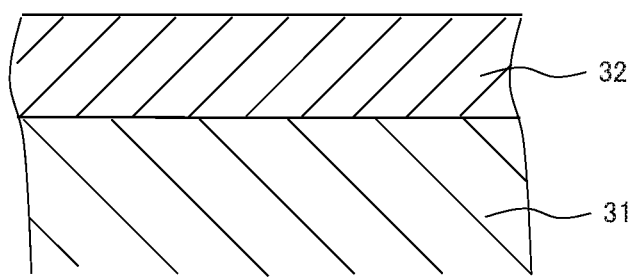
FIG. 2 is an enlarged cross-sectional view of a region around a surface of the separator for the fuel cell in accordance with this embodiment.

In this embodiment, as shown in FIG. 2, each separator 3 includes a metal substrate 31. Examples of the material of the metal substrate 31 include titanium and stainless steel. Further, opposite surfaces of the separator 3 (that is, a surface on the side of the gas diffusion layer 7 and a surface on the side of the adjacent separator 3) are each covered with a tin oxide film 32.

The thickness of the tin oxide film 32 is preferably in the range of 10 to 300 nm. If the thickness of the tin oxide film 32 is less than 10 nm, the advantageous effects of the tin oxide film 32 cannot be fully exerted. Meanwhile, if the thickness of the tin oxide film 32 is greater than 300 nm, internal stress of the tin oxide film 32 becomes high. Therefore, the tin oxide film 32 is likely to peel off from the metal substrate 31.

Although the tin oxide film 32 is formed on each surface of the separator 3 in this embodiment, it is acceptable as long as the tin oxide film 32 is formed on at least a surface of the metal substrate 31 on the side of the gas diffusion layer 7 because a portion where the gas diffusion layer 7 and the separator 3 contact each other has high resistance.

The tin oxide film 32 contains antimony (Sb). Accordingly, the tin oxide film 32 becomes a semiconductor. Specifically, the tin oxide film 32 is made of tin oxide containing 0.2 to 10 atom % of antimony. In such a tin oxide film 32, quadrivalent tin sites in the crystal lattice of tin oxide are substituted with pentavalent antimony. Therefore, the concentration of carriers in the tin oxide film 32 is increased and thus the conductivity of the tin oxide film 32 improves. Accordingly, the contact resistance of the separator 3 having the tin oxide film 32 formed thereon can be reduced, and thus the internal resistance of the fuel cell stack 10 can be reduced.

Herein, if the content of antimony is less than 0.2 atom %, an increase in the concentration of carriers by means of substitution with antimony would be insufficient. Therefore, the conductivity of the tin oxide film is difficult to improve, and thus the contact resistance of the separator 3 cannot be reduced sufficiently.

Meanwhile, even if the content of antimony is greater than 10 atom %, a further reduction in the contact resistance of the separator 3 by means of antimony cannot be expected. This is because even if the concentration of carriers is increased with an increased content of antimony, the increased content of antimony would disturb the movement of the carriers. More preferably, the tin oxide film 32 is made of tin oxide containing 0.5 to 10 atom % of antimony.

Figure 3:
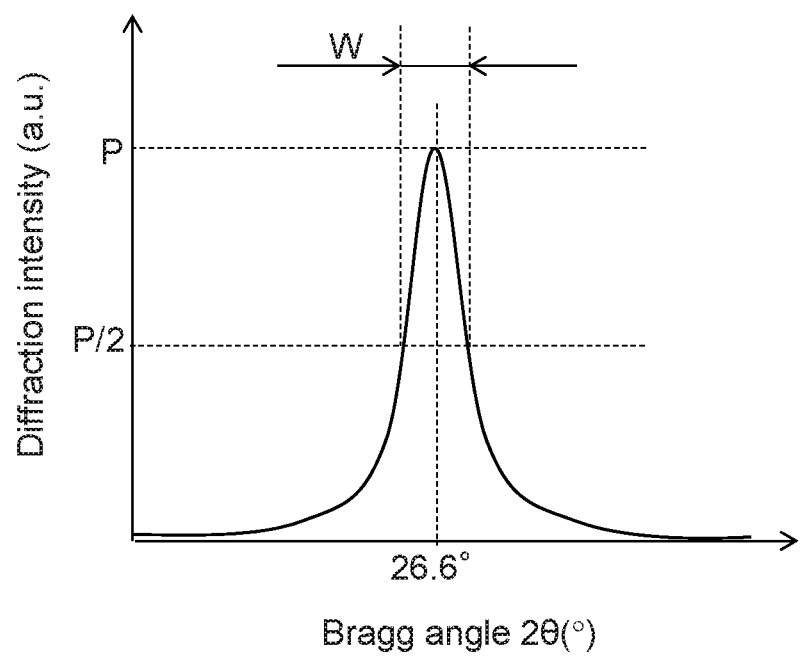
FIG. 3 is a chart illustrating the half width at half maximum of a diffraction peak on the (110) plane of tin oxide of a tin oxide film at around $2\theta=26.6°$ as measured through X-ray diffraction using CuKα rays.

Herein, when tin oxide containing 0.2 to 10 atom % of antimony is measured through X-ray diffraction using CuKα rays, as shown in FIG. 3, a diffraction peak on the (110) plane of tetragonal tin oxide is detected at around a Bragg angle of 2θ=26.6° (specifically, in the range of 26.6°±0.5°).

In this embodiment, the half width at half maximum W of a diffraction peak on the (110) plane of tin oxide of the tin oxide film 32 at around 2θ=26.6° as measured through X-ray diffraction using CuKα rays is preferably less than or equal to 1°. The half width at half maximum W is the width of a diffraction peak at a value half (P/2) the maximum value P of the diffraction intensity of the diffraction peak. In this embodiment, the half width at half maximum of a diffraction peak satisfies a condition of less than or equal to 1° so that the crystallinity of tin oxide forming the tin oxide film 32 is enhanced, and thus the conductivity of the tin oxide film 32 can be increased. Consequently, the contact resistance of the separator 3 can be further reduced.

If the half width at half maximum of the tin oxide film 32 is greater than 1°, the crystallinity of tin oxide forming the tin oxide film 32 becomes low. Therefore, the conductivity of the tin oxide film 32 would decrease and thus the contact resistance of the separator 3 may not be reduced sufficiently. As is obvious from Examples described below, when the half width at half maximum of a diffraction peak on the (110) plane of tin oxide is less than or equal to 0.5°, the contact resistance of the separator 3 can be further reduced.

Further, the tin oxide film 32 is preferably made of tin oxide with oxygen deficiency, or is more preferably made of tin oxide with oxygen deficiency represented by $SnO_{2-X}$ (0.1≤X≤0.4). With tin oxide with oxygen deficiency, the concentration of carriers in the tin oxide film 32 is increased, and thus the conductivity of the tin oxide film 32 improves. Consequently, the contact resistance of the separator 3 is reduced, and thus the internal resistance of the fuel cell stack 10 can be reduced. It should be noted that "tin oxide with oxygen deficiency" as referred to herein is tin oxide with partly missing oxygen with respect to the tetragonal crystal structure of $SnO_2$.

Tin oxide with oxygen deficiency that satisfies X in the aforementioned range can be obtained by, for example, adjusting the partial pressure of oxygen gas during the deposition of a film and a voltage applied during sputtering described below. Herein, if X<0.1, the oxygen deficiency of tin oxide becomes small. Therefore, the effect of reducing the contact resistance of the separator 3 may not be fully exerted. Meanwhile, it would be difficult to form the tin oxide film 32 that satisfies X>0.4.

A method for forming the tin oxide film 32 on the metal substrate 31 of the separator 3 is not particularly limited. For example, the film can be deposited using physical vapor deposition (PVD), such as sputtering, vacuum deposition, ionized evaporation, or ion plating. Specifically, for example, the tin oxide film 32 can be deposited by sputtering a sintered body, which has been obtained by mixing tin oxide particles and antimony oxide particles and sintering them, as a target to the surface of the metal substrate 31, using plasma and the like. In such a case, in depositing the tin oxide film 32, the substrate temperature during the deposition of the film thereon (film deposition temperature), a voltage applied, and the like are adjusted so that the tin oxide film 32 made of tin oxide having a half width at half maximum in the aforementioned range can be obtained.

When the tin oxide film 32 is deposited using sputtering, sputtering is performed under an oxygen gas atmosphere, inert gas atmosphere, or vacuum atmosphere (reduced-pressure atmosphere). In particular, when the tin oxide film is deposited under an inert gas atmosphere or a vacuum atmosphere (reduced-pressure atmosphere), a tin oxide film with oxygen deficiency can be obtained.

EXAMPLES

Hereinafter, the present disclosure will be described with reference to Examples.

Example 1

A test piece corresponding to a separator was produced as described below. First, a pure titanium plate with a thickness of 0.1 mm was prepared as a metal substrate of the separator. Next, the metal substrate was placed in a vacuum chamber, and argon gas was introduced into the vacuum chamber under a vacuum condition, and then a voltage was applied to generate argon ions. With the argon ions, an oxide film on the surface of the metal substrate was removed.

Next, a sintered body, which has been obtained by mixing tin oxide particles and antimony oxide particles and sintering them, was places as a target in the vacuum chamber. With the sintered body as a target, sputtering was performed to form a tin oxide film on the surface of the metal substrate.

Specifically, first, a metal substrate was placed at a position opposite the target, and then, the vacuum chamber was evacuated so as to be placed in a vacuum atmosphere (reduced-pressure atmosphere). Next, argon gas was introduced as sputtering gas into the vacuum chamber, and a voltage was applied with the metal substrate heated to 450° C. so that argon ions generated were caused to collide with the target, and consequently, the target material was deposited on the metal substrate. It should be noted that a bias voltage was applied across the target and the metal substrate. In this manner, a tin oxide film with a thickness of 100 nm was deposited on the surface of the metal substrate.

Next, the content of antimony (Sb) in the tin oxide film was measured from the detection intensity at a binding energy of antimony of 540 eV using an X-ray spectrometer (Quantera SXM produced by ULVAC-PHI, Inc.). Consequently, the content of antimony in the tin oxide film was found to be 0.2 atom % (see Table 1).

Examples 2 to 5

Test pieces were produced as in Example 1. Examples 2 to 5 differ from Example 1 in that tin oxide films of Examples 2 to 5 were deposited by changing the content of antimony oxide in a sintered body as a target so that the resulting tin oxide films contained 0.5 atom %, 3.0 atom %, 5.0 atom %, and 10.0 atom % of antimony, respectively. The content of antimony in each of the tin oxide films of Examples 2 to 5 was measured as in Example 1. Table 1 shows the results.

Comparative Example 1

A test piece was produced as in Example 1. Comparative Example 1 differs from Example 1 in that a tin oxide film was deposited by not including antimony oxide in a sintered body as a target so that the resulting tin oxide film contained 0 atom % of antimony (contained no antimony). The content of antimony in the tin oxide film of Comparative Example 1 was measured as in Example 1. Table 1 shows the results.

Comparative Example 2

A test piece was produced as in Example 1. Comparative Example 2 differs from Example 1 in that a tin oxide film was deposited by changing the content of antimony oxide in a sintered body as a target so that the resulting tin oxide film contained 0.1 atom % of antimony. The content of antimony in the tin oxide film of Comparative Example 2 was measured as in Example 1. Table 1 shows the results.

<Contact Resistance Test>

Figure 4:
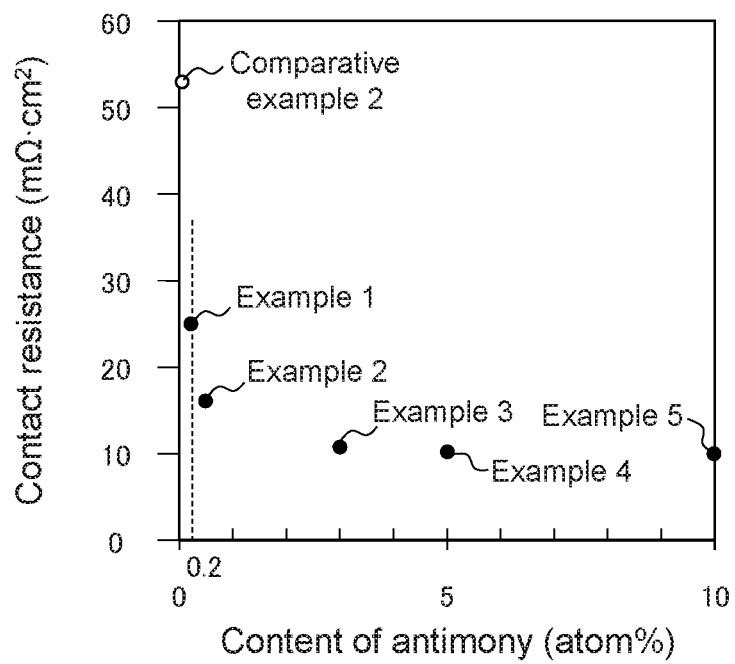
FIG. 4 is a graph showing the relationship between the content of antimony added to a tin oxide film of a test piece of each of Examples 1 to 5 and Comparative Example 2 and the contact resistance of the test piece.

Carbon paper (TGP-H120 with a thickness of 0.5 mm produced by TORAY INDUSTRIES, INC.), which corresponds to a diffusion layer of the power generation portion of the fuel cell, was placed on a surface of each of the tin oxide films of the test pieces of Examples 1 to 5 and Comparative Examples 1 and 2, and a gold-plated copper plate was placed thereon so that the carbon paper was sandwiched between the test piece and the copper plate. It should be noted that in order to measure only the contact resistance between the tin oxide film and the carbon paper, another gold-plated copper plate was also placed in contact with the other surface (which has no film deposited thereon) of the test piece so as to prevent contact resistance from being generated between such members. Next, pressure of a given load (0.98 MPa) was applied to the surface of the test piece using a measuring jig. In such a state, current from a power supply was flowed through the test piece while being adjusted with an ammeter so that the amount of current flowing through the test piece became constant. Then, a voltage applied to the test piece was measured with a voltmeter so as to calculate the contact resistance between the tin oxide film of the test piece and the carbon paper. Table 1 and FIG. 4 show the results.

TABLE 1

| | Content of Antimony (atom %) | Contact Resistance (mΩ · cm$^2$) |
|---|---|---|
| Comparative Example 1 | 0 | No current flowed. |
| Comparative Example 2 | 0.1 | 53 |
| Example 1 | 0.2 | 25 |
| Example 2 | 0.5 | 16 |
| Example 3 | 3.0 | 11 |
| Example 4 | 5.0 | 10 |
| Example 5 | 10.0 | 10 |

<Result 1>

As shown in Table 1, the contact resistance of the test piece in accordance with Comparative Example 1 was found to be large, and no current was able to flow between the test piece and the carbon paper. Accordingly, a tin oxide film not containing antimony like Comparative Example 1 is found to have a high insulating property (have low conductivity).

In addition, as shown in Table 1 and FIG. 4, the contact resistance of Example 1 with an increased content of antimony as compared to those of Comparative Examples 1 and 2 was found to sharply decrease, and the contact resistance of each of Examples 2 to 5 with a sequentially increased content of antimony was found to be substantially constant. Accordingly, it can be said that an antimony content of 0.2 atom % in a tin oxide film has a critical significance in lowering the contact resistance.

It is considered that when tin oxide was made to contain 0.2 to 10 atom % of antimony as in Examples 1 to 5, quadrivalent tin sites in the crystal lattice of tin oxide were substituted with pentavalent antimony, and thus the conductivity of the resulting tin oxide films improved. In particular, when tin oxide is made to contain 0.5 to 10 atom % of antimony, the conductivity of the resulting tin oxide films is considered to further improve.

Herein, if the content of antimony in tin oxide is less than 0.2 atom % (specifically, 0.1 atom %) as in Comparative Example 2, an increase in the concentration of carriers by means of substitution with antimony would be insufficient. Thus, it is considered that the conductivity of the resulting tin oxide film is difficult to improve.

Meanwhile, if the content of antimony is greater than 10 atom %, the concentration of carriers is also increased, but it is considered that the increased content of antimony in the tin oxide would disturb the movement of the carriers. Consequently, it is considered that the conductivity of the resulting tin oxide film will not improve, and thus a further reduction in the contact resistance of the separator by means of antimony cannot be expected.

Examples 6 to 8

Test pieces were produced as in Example 1. Examples 6 and 8 differ from Example 1 in that the temperature of a metal substrate during deposition of a film thereon (deposition temperature) was set to 350° C. and 550° C., respectively. It should be noted that Example 7 is the same as Example 2.

<X-Ray Diffraction Measurement Test>

For the tin oxide film of the test piece of each of Examples 6 to 8, a diffraction peak angle on the (110) plane of tin oxide was detected from an X-ray diffraction pattern using an X-ray analyzer that uses CuKα rays (with a wavelength of 0.154 nm) for an X-ray source as a copper tube. The diffraction peak angle of tin oxide of each test piece was found to be at around a Bragg angle of 2θ=26.6°, and the half width at half maximum of the diffraction peak was measured. Table 2 shows the results. The contact resistance of the test piece of each of Examples 6 to 7 was measured as in Example 1. Table 2 shows the results.

<Rutherford Backscattering Spectrometry (RBS)>

Figure 5:
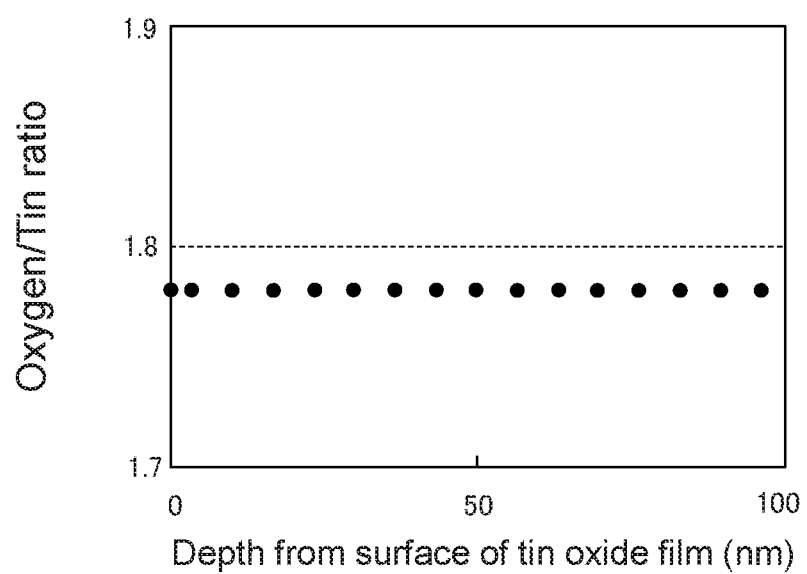
FIG. 5 is a graph showing the ratio of oxygen to tin in a region of from the surface to the inside of a tin oxide film of a test piece of Example 7.

Rutherford backscattering spectrometry was performed on the tin oxide film of the test piece of Example 7 so that the oxygen/tin ratio (atomic ratio) along the thickness direction from the surface of the tin oxide film was measured. FIG. 5 shows the results.

TABLE 2

| | Film Deposition Temperature (° C.) | Half Width at Half Maximum (°) | Contact Resistance (mΩ · cm$^2$) |
|---|---|---|---|
| Example 6 | 350 | 1.1 | 45 |
| Example 7 | 450 | 0.5 | 16 |
| Example 8 | 550 | 0.3 | 12 |

<Result 2>

As shown in Table 2, regarding the test piece of each of Examples 7 and 8, the half width at half maximum of a diffraction peak on the (110) plane of tin oxide of the tin oxide film was found to be smaller than that of Example 6. Therefore, the crystallinity of tin oxide of the tin oxide film of each of Examples 7 and 8 is considered to be higher than that of Example 6. Further, the contact resistance of the test piece of each of Examples 7 and 8 was found to be lower than that of Example 6.

Accordingly, when the half width at half maximum of a diffraction peak is less than or equal to 1°, or more preferably, less than or equal to 0.5° like the test piece of each of Examples 7 and 8, the crystallinity of tin oxide of the tin oxide film is high. Accordingly, it is considered that the conductivity of the tin oxide film is increased, and thus the contact resistance of the test piece (separator) is reduced.

Further, as shown in FIG. 5, regarding the test piece of Example 7, the oxygen/tin ratio (atomic ratio) along the thickness direction from the surface of the tin oxide film was found to be 1.78. This is considered to be due to the reason that when a film was deposited under a vacuum atmosphere as in Example 7, some of oxygen atoms moving toward the metal substrate from the target were desorbed.

As described above, the tin oxide film of the test piece of Example 7 is made of tin oxide with oxygen deficiency represented by $SnO_{1.78}$, and with the tin oxide with oxygen deficiency, the concentration of carriers is increased. Therefore, it is considered that the conductivity of the tin oxide film is increased, and thus the contact resistance of the test piece (separator) is reduced.

Although the embodiments of the present disclosure have been described in detail above, specific configurations are not limited thereto, and any design changes that are within the spirit and scope of the present disclosure are included in the present disclosure.

DESCRIPTION OF SYMBOLS

1 Cell
2 MEGA (power generation portion)

3 Separator (separator for fuel cell)
4 Membrane electrode assembly (MEA)
6 Electrode
7 Gas diffusion layer
10 Fuel cell stack (fuel cell)
21, 22 Gas flow channels
31 Metal substrate
32 Tin oxide film

What is claimed is:

1. A separator for a fuel cell, the separator being adapted to be in contact with a first power generation portion including a membrane electrode assembly of the fuel cell so as to separate the first power generation portion from a second power generation portion of an adjacent fuel cell, the separator comprising:
    a metal substrate made of metal; and
    a tin oxide film directly covering at least a surface of the metal substrate on a side of the first power generation portion,
    wherein:
        the tin oxide film is made of tin oxide containing 0.2 to 10 atom % of antimony,
        the tin oxide film is made of tin oxide with oxygen deficiency represented by $SnO_{2-x}$ and X satisfies $0.1 \leq X \leq 0.4$,
        a half width at half maximum of a diffraction peak on a (110) plane of the tin oxide of the tin oxide film at around $2\theta=26.6°$, as determined through X-ray diffraction using CuKα rays, is less than or equal to 1°, and
        the tin oxide in the tin oxide film covers said surface of the metal substrate on said side of the first power generation portion.

2. The separator for a fuel cell according to claim 1, wherein the tin oxide film is made of tin oxide containing 0.5 to 5.0 atom % of antimony.

3. The separator for a fuel cell according to claim 1, wherein the tin oxide film covers an entirety of the surface of the metal substrate on the side of the first power generation portion.

4. The separator for a fuel cell according to claim 1, wherein the tin oxide film covers at least a surface of the metal substrate on each of two sides of the first power generation portion.

5. The separator for a fuel cell according to claim 1, wherein the tin oxide film covers an entirety of the surface of the metal substrate on each of two sides of the first power generation portion.

6. The separator for a fuel cell according to claim 1, wherein the separator defines waves forming trapezoids having equal legs,
    each of the waves having a flat top portion and each of the legs extending angularly from a respective opposite end of the top portion and defining a same angle with respect to the flat top portion.

* * * * *